United States Patent
Berchtenbreiter

(10) Patent No.: US 7,585,103 B2
(45) Date of Patent: Sep. 8, 2009

(54) MIXING HEAD WITH CREEP BARRIER ON THE CLEANING PISTON

(75) Inventor: Ernst Berchtenbreiter, Kissing (DE)

(73) Assignee: KraussMaffei Technologies GmbH, München (DE)

(*) Notice: Subject to any disclaimer, the term of this patent is extended or adjusted under 35 U.S.C. 154(b) by 0 days.

(21) Appl. No.: 12/189,510

(22) Filed: Aug. 11, 2008

(65) Prior Publication Data
US 2008/0298161 A1    Dec. 4, 2008

Related U.S. Application Data

(63) Continuation of application No. PCT/EP2006/069622, filed on Dec. 12, 2006.

(30) Foreign Application Priority Data

Feb. 24, 2006 (DE) .................. 10 2006 009 117

(51) Int. Cl.
    *B01F 5/04*      (2006.01)
    *B29B 7/76*      (2006.01)

(52) U.S. Cl. .................... 366/162.5; 422/133

(58) Field of Classification Search .......... 366/138, 366/159.1, 162.4, 162.5, 167.1, 173.1; 422/131, 422/133–135

See application file for complete search history.

(56) References Cited

U.S. PATENT DOCUMENTS

| | | | | |
|---|---|---|---|---|
| 3,189,325 A | * | 6/1965 | Levy | 366/162.5 |
| 4,503,014 A | * | 3/1985 | Bauer | 422/135 |
| 4,523,696 A | | 6/1985 | Commette et al. | |
| 4,778,083 A | | 10/1988 | Decker | |
| 4,834,545 A | * | 5/1989 | Inoue et al. | 366/138 |
| 5,201,580 A | * | 4/1993 | Bauer | 366/159.1 |
| 6,502,978 B2 | * | 1/2003 | Bonansea et al. | 366/162.5 |

FOREIGN PATENT DOCUMENTS

| | | |
|---|---|---|
| DE | 35 22 618 A1 | 1/1987 |
| DE | 36 18 395 A1 | 12/1987 |
| EP | 25094 A1 * | 3/1981 |
| EP | 0 391 152 A | 10/1990 |
| JP | 61 187926 | 8/1986 |
| JP | 63 293020 | 11/1988 |
| WO | WO 2007098815 A1 * | 9/2007 |

* cited by examiner

*Primary Examiner*—Charles E Cooley
(74) *Attorney, Agent, or Firm*—Henry M. Feiereisen; Ursula B. Day

(57) ABSTRACT

A mixing head includes a mixing device which is secured to a housing and has a mixing chamber for mixing at least two plastic components to form a material mixture. Received in a recess of the housing is a cleaning device which has a cleaning piston for back-and-forth movement in relation to the mixing chamber between a first position in which the cleaning piston is retracted from the mixing chamber and a second position in which the cleaning piston extends into the mixing chamber. The cleaning device has a barrier which interacts with a housing wall for pushing the material mixture radially outside. The barrier has a flank which has an incline which is steeper than an incline of the housing wall.

12 Claims, 2 Drawing Sheets

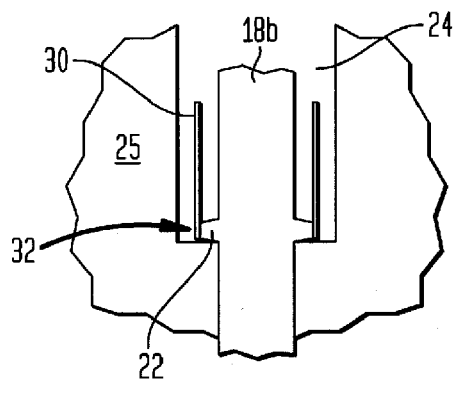
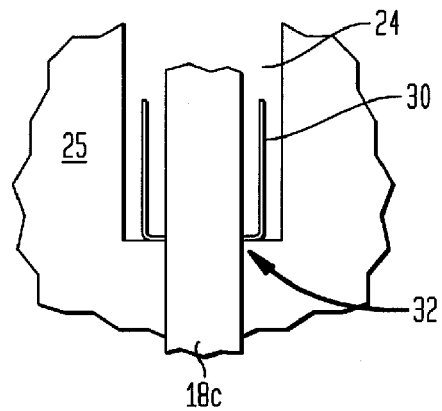
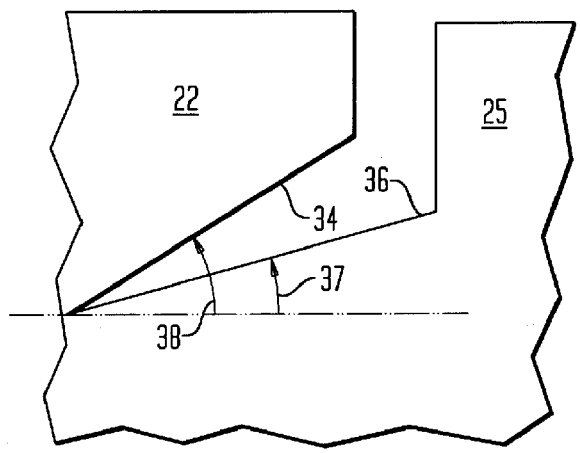
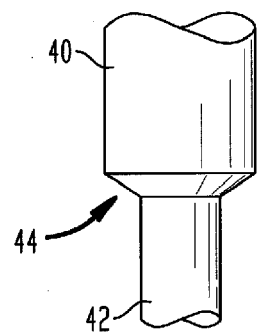

MIXING HEAD WITH CREEP BARRIER ON THE CLEANING PISTON

CROSS-REFERENCES TO RELATED APPLICATIONS

This application is a continuation of prior filed copending PCT International application no. PCT/EP2006/069622, filed Dec. 12, 2006, which designated the United States and has been published but not in English as International Publication No. WO 2007/098815 and on which priority is claimed under 35 U.S.C. §120, and which claims the priority of German Patent Application, Serial No. 10 2006 009 117.5, filed Feb. 24, 2006, pursuant to 35 U.S.C. 119(a)-(d), the contents of which are incorporated herein by reference in its entirety as if fully set forth herein.

BACKGROUND OF THE INVENTION

The present invention relates, in general, to a mixing head, and more particularly to a mixing head for processing a reactive material mixture of at least two plastic components reacting with one another.

Nothing in the following discussion of the state of the art is to be construed as an admission of prior art.

Mixing heads are used for processing a reactive material mixture of at least two plastic components, which react with one another. The plastic components are introduced into a mixing chamber, intimately mixed with one another in the mixing chamber, and discharged on one end of the mixing chamber, usually via a discharge pipe. The discharge is realized in most cases in a molding tool or cavity of a molding tool. To prevent plastic material from reacting out in the mixing chamber and conglutinate the latter, the mixing chamber interacts with a cleaning piston which is retracted from the mixing chamber during material discharge. When no discharge from the mixing chamber is intended after a shot cycle, the cleaning piston is moved into the mixing chamber to clean it. In the event, a new material discharge is then intended again, the cleaning piston is again retracted and the thus cleared mixing chamber can assume its intended operation. For this purpose, the cleaning piston can be operated to reversibly move back and forth. The movement is generated by means of a drive which acts on one end of the cleaning piston. The connection between drive and cleaning piston is implemented via a shaft.

At least a tolerance gap is maintained between the cleaning piston and the mixing chamber and the housing in surrounding relationship to the cleaning piston behind the mixing chamber for allowing the back-and-forth movement of the cleaning piston. Such a smallest tolerance gap depends on the used material mixture and is oftentimes sufficient to move the plastic component or the already mixed material mixture along the cleaning piston. This is referred to as a "creep" of this material "along" the cleaning piston or the attached shaft. When failing to prevent this creepage, the plastic components or the material mixture may adhere to the shaft of the cleaning piston or migrate along the cleaning piston up to the drive. This causes not only contamination in the area of the mixing head. The plastic components may also cure in the area of the drive and cause seizing of the cleaning piston altogether. In this case, the mixing head would become inoperative and would have to be repaired. Regardless, removal of material that creeps up the cleaning piston or its shaft must normally be carried out every day and is complex to implement. This poses a particular problem when low-viscosity flexible foam materials are involved which have a long reaction time. In the event, the material foam migrates into the drive, hydraulic oil is contaminated and can be cleaned again only in a very costly manner.

There is also the further problem of entrainment of the foamed material via the shaft—also called piston rod—up to the hydraulic zone (drive for the cleaning piston), thereby risking oil contamination.

It would be desirable and advantageous to provide an improved mixing head to obviate prior art shortcomings and to prevent material creepage as well as allow easy cleaning.

SUMMARY OF THE INVENTION

According to one aspect of the present invention, a mixing head includes a housing, a mixing device secured to the housing and having a mixing chamber for mixing at least two plastic components to form a material mixture, and a cleaning device having a cleaning piston received in a recess of the housing for back-and-forth movement in relation to the mixing chamber between a first position in which the cleaning piston is retracted from the mixing chamber and a second position in which the cleaning piston extends into the mixing chamber, said cleaning device having a barrier which interacts with a housing wall for pushing the material mixture radially outside, wherein the barrier has a flank which has an incline which is steeper than an incline of the housing wall.

The present invention resolves prior art problems by providing the cleaning device with a barrier in the form of a thickened region, a rosette-like bead, or a diametric enlargement, thereby creating a creep barrier for the plastic components or the material mixture. In particular, when combined with a housing wall, foam entrained into the free space is displaced radially outwards so as to create a free space for the shaft (also called piston rod), thereby effectively preventing a contamination above the barrier. Tests have shown a very good result for the mixing head according to the invention. No longer has any foam been entrained beyond the barrier, and there was no longer any need for cleaning hydraulic oil.

According to another feature of the present invention, the barrier may be provided on the cleaning device at a position in close proximity of the housing wall, when the cleaning piston has moved to the second position.

According to another feature of the present invention, the barrier may be configured in the form of a ring, which may be made integrally with the cleaning piston or may be attached subsequently, in particular shrunk, onto the cleaning piston. In this context, it is important to provide the thickened region or the enlargement, i.e. the ring for example, firmly on the cleaning piston or its shaft to thereby prevent its displacement as the cleaning piston moves.

The barrier is moved back and forth in a recess of the housing. This recess, also called "bell", is bounded on the side of the mixing chamber by a housing wall which interacts with a flank of the barrier. The barrier may thus have a semicircular cross section, triangular cross section, or trapezoidal cross section.

According to another feature of the present invention, the lower wall of the barrier in opposition to the housing wall has an incline which is greater than the incline of the housing wall, with which the lower barrier wall, so as to realize a radial displacement of material mixture to the outside.

BRIEF DESCRIPTION OF THE DRAWING

Other features and advantages of the present invention will be more readily apparent upon reading the following descrip

FIG. 3a is an enlarged detailed view of the mixing head, depicting the cleaning piston with its barrier in the one end position;

FIG. 3b is an enlarged detailed view of the mixing head, depicting the cleaning piston with its barrier in the retracted position in which the cleaning piston is moved upwardly;

FIG. 4 is an enlarged detailed view of the mixing head, depicting the barrier in an area opposite to a housing wall; and FIG. 5 is an enlarged detailed view of a variation of a cleaning piston for a mixing head in accordance with the invention.

DETAILED DESCRIPTION OF PREFERRED EMBODIMENTS

Figure 2:
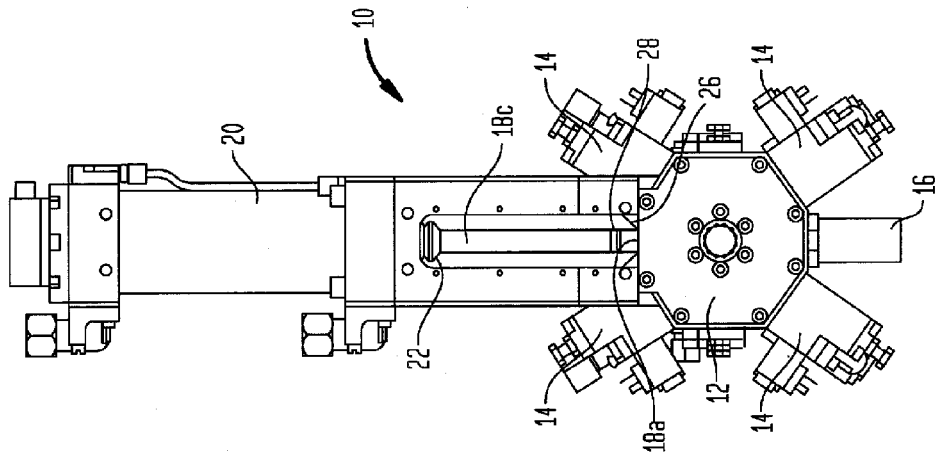
FIG. 2 is a schematic illustration of the mixing head with the cleaning piston in a retracted position.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
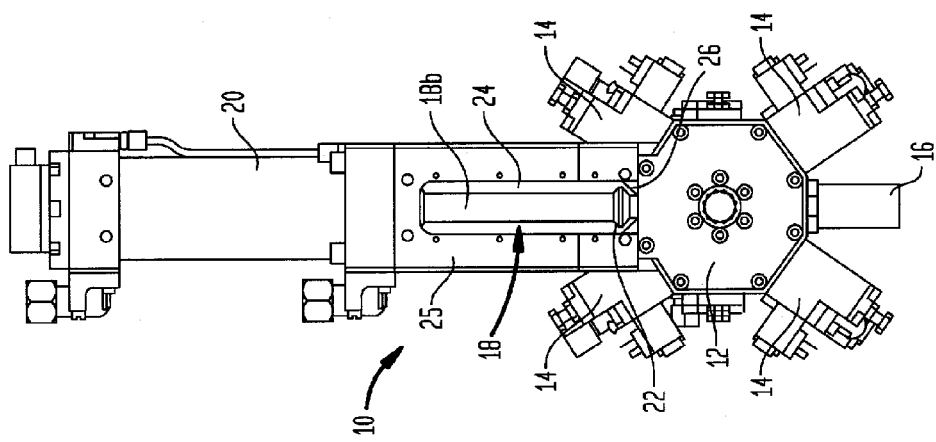
- FIG. 1 is a schematic illustration of a mixing head according to the invention, depicting a cleaning piston in one end position.

Turning now to the drawing, and in particular to FIG. 1, there is shown a schematic illustration of a mixing head according to the invention, generally designated by reference numeral 10 and including a housing 25 and a mixing device 12 which is connected to the housing 25 and configured to accommodate a mixing chamber (not shown). Further arranged on the mixing device 12 are four injection nozzles 14 by which plastic material or additives can be introduced into the mixing chamber.

Arranged to the lower end of the mixing chamber is an outlet pipe 16 by which a material mixture produced in the mixing chamber can be discharged from the mixing head 10. The mixing chamber can be cleaned by a cleaning device, generally designated by reference numeral 18 and including a cleaning piston 18a which is operatively connected to a hydraulic drive 20 for back-and-forth movement via a piston rod comprised of an upper shaft portion 18b and a lower shaft portion 18c. FIG. 1 shows the cleaning device 18 in one end position in which the cleaning piston 18a is moved downwards to extend into the mixing chamber for cleaning the mixing chamber. Only the upper shaft portion 18b of the cleaning device 18 is visible in FIG. 1.

FIG. 2 shows the cleaning piston 18a in a retracted end position so that the mixing chamber is cleared. In this state, starting materials can be introduced via the injection nozzles 14 into the mixing chamber, mixed there, and discharged via the outlet pipe 16. Only the lower shaft portion 18c of the cleaning device 18 and a small part of the cleaning piston 18a immediately adjacent to the lower shaft portion 18c are visible in FIG. 2. The confronting ends of the cleaning piston 18a and the lower shaft portion 18c are hereby connected to one another by a bushing 28.

The upper shaft portion 18b and the lower shaft portion 18c of the cleaning device 18 are optically separated by an annular bead 22 which serves—as will be explained hereinafter—as a creep barrier. FIG. 1 shows the bead 22 in a lower position, as the cleaning piston 18a has been moved forwards. FIG. 2 shows the bead 22 in a retracted position, as the cleaning piston 18a has been moved backwards.

The annular bead 22 is received in a recess 24 of the housing 25 of the mixing head for back-and-forth movement. This recess 24, also called bell, is provided to receive foamed material and permits a sufficient movement range for the bead 22. The lower end of the recess 24 is defined by a conical housing wall 26 of the housing 25. Of course, this part may also be configured differently. For example, it is possible to configure the conical part as part of the headpiece or it is even possible to omit it altogether and to configure the housing wall planar.

The effect of the annular bead 22 will now be explained with reference to FIGS. 3a and 3b.

The cleaning piston 18a is necessarily surrounded by flexible foamed material entering the annular gap between mixing chamber and cleaning piston 18a. As the cleaning device 18 and thus the cleaning piston 18a moves upwards, this material is entrained upwards. As a result of friction effects and material that continues to push out, foamed material creeps upwards along the cleaning piston 18a as a result of the cycled movement of the cleaning piston 18a. When the cleaning piston 18a moves downwards, the foamed material is wiped off on the housing entry for the lower shaft portion 18c and pushed by the bead 22 in cooperation with the conical housing wall 26 radially to the outside, as indicated by reference numeral 32. During the next cycle, material is again pushed radially outside so that material displaced during the preceding cycle is pushed upwards. As a consequence, a cylindrical foamed material layer (tube) 30 is formed which is depicted in FIG. 3a.

This tube 30 grows slightly upwards during each downward movement step. As a consequence of the thickened region established by the bead 22, the tube 30 is, however, distanced radially from the upper shaft portion 18b, shown in particular in FIG. 3b in which the cleaning piston 18a is moved upwards again. Thus, the upper shaft portion 18b is not touched by the tube 30 and thus cannot be contaminated. In this way, the upper shaft portion 18b remains clean, and there is no material that is entrained upwards via the shaft portion 18b.

The foamed material tube, when configured respectively long, is removed, e.g. once a day. As the foamed material tube is not glued to the shaft portion 18b but rather remains "free", removal thereof is easy to realize.

It is also suitable, as shown in FIG. 4, to configure the lower end wall of the bead 22 with an incline (arrow 38) which is steeper than the incline (arrow 37) of the housing wall 36 which cooperates with the bead 22. This promotes the radial displacement of material.

It is also possible, as shown in FIG. 5, to simply radially expand the shaft of the cleaning piston from a narrower lower portion 42 to a thicker upper portion 40, thereby forming a transition 44. This conical enlargement also causes the displacement effect. However, there is no assurance that the upper part 40 is prevented from contacting the thus configured material tube. It is more suitable to configure this part slightly recessed radially.

The present invention effectively prevents ingress of reactive plastic components into the drive, thereby contributing to operating safety and longevity of the mixing head.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A mixing head, comprising:
a housing;
a mixing device secured to the housing and having a mixing chamber for mixing at least two plastic components to form a material mixture; and
a cleaning device having a drive and a cleaning piston received in a recess of the housing and operated by the drive for back-and-forth movement in relation to the mixing chamber between a first position in which the cleaning piston is retracted from the mixing chamber and a second position in which the cleaning piston extends into the mixing chamber, said cleaning piston having a piston rod comprised of an upper shaft portion and a lower shaft portion, said cleaning device having a barrier provided at a transition between the lower and upper shaft portions and interacting with a housing wall for pushing the material mixture radially outwards, said barrier having a flank which has an incline which is steeper than an incline of the housing wall.

2. The mixing head of claim 1, wherein the barrier is sized to have a circumferential region of a thickness which is greater than a thickness of the upper and lower shaft portions of the piston rod.

3. The mixing head of claim 1, wherein the upper shaft portion has a diameter which is greater than the lower portion of the shaft to define the barrier of the cleaning device.

4. The mixing head of claim 1, wherein the barrier is rosette-like bead of the cleaning device.

5. The mixing head of claim 1, wherein the barrier is provided on the cleaning device at a position in close proximity of the housing wall, when the cleaning piston has moved to the second position.

6. The mixing head of claim 1, wherein the barrier has a substantially annular shape.

7. The mixing head of claim 1, wherein the barrier has a substantially semicircular cross section, triangular cross section, or trapezoidal cross section.

8. The mixing head of claim 1, wherein the barrier is configured integral with the cleaning piston.

9. The mixing head of claim 1, wherein the barrier is a ring pushed onto the cleaning piston.

10. The mixing head of claim 1, wherein the barrier is a ring shrunk onto the cleaning piston.

11. The mixing head of claim 1, wherein the barrier is located in the recess between the drive and the mixing chamber during back-and-forth movement of the cleaning piston and sized to extend at a radial distance to the housing wall so as to prevent material from adhering to the cleaning piston and creepage to the drive as the cleaning piston moves between the first and second positions.

12. The mixing head of claim 11, wherein the barrier is sized to allow formation of a material tube in the recess as material is pushed by the barrier outwards at a distance to the upper shaft portion for subsequent removal.

* * * * *